United States Patent [19]

Hammerschmidt et al.

[11] Patent Number: 6,010,798

[45] Date of Patent: Jan. 4, 2000

[54] PEM FUEL CELL

[75] Inventors: Albert Hammerschmidt, Erlangen; Wolf-Dieter Domke, Röttenbach; Christoph Nölscher, Nürnberg; Peter Suchy, Erlangen, all of Germany

[73] Assignee: Siemens Aktiengesellschaft, Munich, Germany

[21] Appl. No.: 08/894,759

[22] PCT Filed: Mar. 22, 1996

[86] PCT No.: PCT/DE96/00497

§ 371 Date: Aug. 27, 1997

§ 102(e) Date: Aug. 27, 1997

[87] PCT Pub. No.: WO96/31913

PCT Pub. Date: Oct. 10, 1996

[30] Foreign Application Priority Data

Apr. 7, 1995 [DE] Germany .......................... 195 13 292

[51] Int. Cl.$^7$ .................................................. H01M 8/22
[52] U.S. Cl. ............................. 429/30; 429/41; 429/44; 429/33
[58] Field of Search ................................ 429/30, 40, 41, 429/44, 33

[56] References Cited

U.S. PATENT DOCUMENTS

| | | | |
|---|---|---|---|
| 4,215,183 | 7/1980 | MacLeod | 429/30 |
| 4,649,091 | 3/1987 | McElroy | 429/30 |
| 4,678,724 | 7/1987 | McElroy | 429/30 |
| 5,242,764 | 9/1993 | Dhar | 429/30 |
| 5,399,184 | 3/1995 | Harada | 29/623.4 |
| 5,672,439 | 9/1997 | Wilkinson et al. | 429/40 |

FOREIGN PATENT DOCUMENTS

| | | |
|---|---|---|
| 0 560 295 A1 | 9/1993 | European Pat. Off. . |
| 0 569 062 A2 | 11/1993 | European Pat. Off. . |
| 33 21 984 | 12/1983 | Germany . |
| 42 06 490 A1 | 9/1993 | Germany . |
| 44 42 285 C1 | 2/1996 | Germany . |
| WO92/13365 | 8/1992 | WIPO . |
| WO94/14203 | 6/1994 | WIPO . |

OTHER PUBLICATIONS

Wilson, M. et al., High Performance Catalyzed Membranes of Ultra–low Pt Loadings for Polymer Electrolyte Fuel Cells, Journal of the Electrochemical Society, vol. 139, No. 2 (1992), pp. L28–L30.

Lu Xianping, et al., "Thermal and electrical conductivity of monolithic carbon aerogels," Journal of Applied Physics, vol. 73 (1993), pp. 581–584.

Yasuda, K. et al., "Polymerization–Pressure Dependencies of Properties of Perfluorosulfonate Cation–Exchanger Thin Films by Plasma Polymerization," Ber. Bunsenges. Phys. Chem. 98 (1994), No. 4, pp. 631–635.

Uchimoto, Y. et al., "Thin Cation–Exchanger Films by Plasma Polymerization of 1,3–Butadiene and Methyl Benzenesulfonate," Journal of Electrochemical Society, vol. 138 (1991), pp. 3190–3193.

Scherer, G., "Polymer Membranes for Fuel Cells," Berichte der Bunsengesellschaft für Physikalische Chemie, Bd. 94 (1990), pp. 1008–1014.

Wilson, M.. et al., "Thin–film catalyst layers for polymer electrolyte fuel cell electrodes," Journal of Applied Electrochemistry, vol. 22 (1992), pp. 1–7.

Extended Abstracts, vol. 93/1 (1993), p. 40, Abstract No. 31.

Chemical Abstracts, vol. 119, No. 6 (1993), Abstract No. 52795h.

Primary Examiner—Maria Nuzzolillo
Assistant Examiner—Laura Weiner
Attorney, Agent, or Firm—Kenyon & Kenyon

[57] ABSTRACT

A fuel cell with a proton-conducting membrane, on which catalyst material and a collector are arranged on both sides, is characterized by the following features: on the side facing the membrane (14), the collectors (16,18) are provided with an electrically conductive gas-permeable carbon aerogel with a surface roughness of <2 $\mu$m; a catalyst layer (15, 17) of platinum or a platinum alloy is in each case applied to the carbon aerogel by material bonding; and a membrane (14), deposited by plasma-chemical means, with a layer thickness of between 3 and 50 $\mu$m, is located between the catalyst layers (15, 17).

14 Claims, 1 Drawing Sheet

PEM FUEL CELL

BACKGROUND OF THE INVENTION

The invention relates to a fuel cell with a proton-conducting membrane, on which catalyst material and a collector are arranged on both sides.

Fuel cells are used for electrochemical conversion of chemical energy, in particular in the form of gaseous hydrogen and oxygen, into electrical energy. Of the large number of known types, so-called PEM fuel cells (PEM=polymer-electrolyte membrane) are preferred, for example for mobile use. The advantages of fuel cells of this type reside in a comparatively low operating temperature (up to about 100° C.), in the absence of a corro-sive liquid electrolyte, in the stability with respect to carbon dioxide ($CO_2$) and, finally, in a relatively simple mechanical structure. In addition to the cell housing, cooling units or separators, gas supply or distribution means and means for constructing fuel cell stacks from individual elements, PEM fuel cells actually consist essentially of two gas-permeable, porous, electrically conductive collectors on the anode and cathode sides, which are next to the solid-electrolyte membrane.

Between the collector and the membrane, there is in each case a catalyst in finely divided, catalytically active form, for example platinum or a platinum alloy. One side of the fuel cell is supplied with a combustible gas in particular hydrogen or a hydrogen-containing gas, and the other side is supplied with an oxidant, in particular oxygen or an oxygen-containing gas, such as air. Hydrogen is oxidized at the anode, protons being produced which diffuse through the membrane to the oxygen side; in this case, water is generally entrained with them (so-called drag effect). At the cathode, the protons recombine with reduced oxygen to form water, referred to as product water, which is removed in suitable fashion from the fuel cell.

Through the drag effect, water is drawn from the anode side of the membrane, so that this side dries out and therefore loses its function if not enough water is added. Further problems are the high costs for production of the membrane, and the lack of cost-efficient processes for producing membrane/electrode units with a low level of catalyst coating and high power density, in particular for operation with air at close to atmospheric pressure. Indeed, for relatively thick membranes, the ohmic losses have a power-reducing effect.

Technical solutions for fuel cells are already known (see, for example, DE-A 33 21 984 and EP-A 0 560 295). The gas-permeable, electron-conducting layers, that is to say collectors, used in this case are carbon paper (U.S. Pat. No. 4,215,183) and carbon fabric ("J. Appl. Electrochem.", Volume 22 (1992), pages 1 to 7); metal structures may also be considered (DE-A 42 06 490). The proton-conducting membranes used are perfluorinated sulfonated polymers such as nafion, raymion and permion ("Ber. Bunsenges. Phys. Chem.", Volume 94 (1990), pages 1008 to 1014). For the sake of convenience, the layer thickness of the membranes is between 50 and 200 $\mu$m. Important properties of the membranes are heat-resistance (up to about 100° C.), reduction and oxidation stability, resistance to acid and hydrolysis, sufficiently low electrical resistivity (<10 $\Omega \cdot$cm) with ion conduction ($H^+$) at the same time, low hydrogen or oxygen permeation and freedom from pin-holes. At the same time, the membranes should be as hydrophilic as possible in order, through the presence of water, both to ensure proton conduction and (by reversed diffusion of water to the anode) to prevent the membrane from drying out and therefore to prevent a reduction in the electrical conductivity. In general, properties of this type are achieved with materials which have no aliphatic hydrogen-carbon bonds, which, for example, is achieved by replacing hydrogen by fluorine or by the presence of aromatic structures; the proton conduction results from the incorporation of sulfonic acid groups (high acid strength).

The electrodes, that is to say the catalyst layers arranged between the collectors and the proton-conducting membrane are essential for correct operation of a fuel cell. On these layers, which consist of very finely divided catalyst material which, for example, may be applied to carbon, the fundamental processes take place, namely adsorption, dissociation and oxidation of hydrogen on the anode side, or the corresponding reduction of oxygen on the cathode side. The layers must have sufficient gas permeability and catalytic activity, that is to say a large internal surface area, the intention being for the amount of catalyst, for example platinum, to be as small as possible for economic reasons. As an example, fuel-cell electrodes currently require amounts of platinum of between 3 mg/cm$^2$ (EP-A 0,560,295) and 0.095 mg/cm$^2$ (EP-A 0,569,062) or 0.07 mg/cm$^2$ ("J. Electrochem. Soc.", Volume 139 (1992), pages L28 to L30). In order to ensure intimate contact between the collector, electrode (=catalyst) and membrane, the layers are usually compressed at high temperature. The housings of the individual fuel cells are configured in such a way that a good gas supply is ensured, and at the same time the product water can be discharged properly. In order to obtain sufficient power, fuel cells are usually joined to form stacks, the requirements which have been mentioned being met through the design.

Although it is actually known to achieve internal wetting through thin membranes (WO 92/13365), this is limited by the minimum handlable layer thickness (>50 $\mu$m). In addition, it is already known (U.S. Pat. No. 5,242,764) to apply thin membranes (>20 $\mu$m) by wet chemical means to electrodes, and subsequently compress them (total thickness >40 $\mu$m). However, this procedure is restricted because of the wet chemical method, for example in terms of layer thickness and material losses in the process, and, in addition, there is no indicated solution as to how the requirements for planarity on the collector surface, in particular for relatively thin membranes, can be met. Furthermore, the electrode which is used has a platinum coating level of 1 mg/cm$^2$ and is therefore a long way from meeting the requirements in terms of high power density and low cost. In addition, the membrane/electrode unit is sealed at the edge by a membrane, having a central opening, which overlaps this unit. However, this is very difficult and intricate to carry out, because the sealing membrane must likewise be very thin; furthermore, gradation of the membrane is very expensive.

Yet other problems can occur with current technology. Thus, for example, collectors made of graphite paper or carbon fabric, even when they are compressed at high pressure, sometimes only have point contact with the catalyst material. It then becomes difficult for the electrons to flow from the electrode to the collector. The membranes are currently produced using conventional wet chemical methods (polymerization, sulfonation), but this necessarily leads to waste disposal problems and to environmental pollution.

SUMMARY OF THE INVENTION

The object of the invention is to design a fuel cell with a proton-conducting membrane, on which catalyst material and a collector are arranged on both sides, in such a way that, on the one hand, the internal resistance of the membrane is reduced and the fuel side is prevented from drying out, and, on the other hand, economic production of the membrane is possible.

This is achieved according to the invention in that on the side facing the membrane, the collectors are provided with an electrically conductive gas-permeable carbon aerogel with a surface roughness of <2 μm, a catalyst layer of platinum or a platinum alloy is in each case applied to the carbon aerogel by material bonding, and a membrane, deposited by plasma-chemical means, with a layer thickness of between 3 and 50 μm, is located between the catalyst layers.

DETAILED DESCRIPTION OF THE INVENTION

One essential feature of the fuel cell according to the invention, which can be referred to as a "thin-layer fuel cell", is the carbon aerogel. This material, which is known per se (in this regard, see, for example: "J. Appl. Phys.", Volume 73 (1993), pages 581 to 584) is applied to a collector, using a suitable method. The collector preferably consists of graphite paper or carbon fabric and is advantageously rendered hydrophobic, for example with polytetrafluoroethylene.

The carbon aerogel preferably has an electrical conductivity of between $10^{-2}$ and $10^3$ $\Omega^{-1} \cdot cm^{-1}$ and a density of between 0.06 and 0.7 $g/cm^3$; the pore size is between 20 and 100 nm (porosity up to about 95%). The hydrophobicity of the carbon aerogel can be set by selecting the starting monomers and through process control, as well as by a corresponding secondary treatment. The essential object of the carbon aerogel consists in producing substantial local planarization (roughness <2 μm) of the very uneven surface structure of graphite paper and carbon fabric. On the one hand, this permits intimate contact between the collector and the catalyst material and, on the other hand, the carbon aerogel represents a substrate which has sufficient planarity to make it possible to deposit a relatively thin membrane by plasma-chemical means.

The catalyst is applied in a thin layer to the carbon aerogel. This is advantageously done using a plasma-chemical process, platinum being deposited in a thin porous layer in a plasma deposition reactor, for example in a low-pressure plasma between $10^{-4}$ and 10 mbar, from an organic platinum compound which is gaseous at these pressures, for example trimethylcyclopentadienylplatinum; the excitation can take place using radio-frequency, microwaves or an ECR transmitter (ECR=electron cyclotron resonance). Layers of this type have an electrical resistivity of <1 mΩ·cm, for example a resistivity of about 20 μΩ·cm. As an alternative, however, sputtering methods and other deposition methods can be used for producing the platinum layers (in this regard, see: "J. Electrochem. Soc.", Volume 139 (1992), pages L28 to L30).

The catalyst layer is arranged on the proton-conducting membrane, which has a layer thickness of between 3 and 50 μm, preferably between 5 and 20 μm. This membrane, which is produced using a plasma polymerization process, preferably has an electrical resistivity of <10 Ω·cm when it is in the wet state. The plasma-chemical deposition advantageously takes place in a low-pressure plasma, between $10^{-4}$ and 10 mbar, excited by radio-frequency, microwaves or an ECR transmitter, using monomers which are gaseous at these pressures. Suitable monomers are, for example, perfluorinated compounds, for example octafluorocyclobutane and perfluorobenzene, or even monomers with C—H bonds which, in the plasma polymer, do not form any aliphatic H atoms which could constitute attack sites for oxidative breakdown. The proton-conducting property of the membrane is achieved by adding suitable gases to the process gas, for example $SO_2$, $SO_3$, trifluoromethanesulfonic acid or the fluoride thereof, strongly acidic carboxylic acids, for example trifluoroacetic acid, and volatile phosphoric acid compounds (in this regard, see: "Ber. Bunsenges. Phys. Chem.", Volume 98 (1994), pages 631 to 635).

The processes of the plasma deposition of catalyst and membrane may partially take place at the same time. In this way, it is possible to effect intimate combination of the catalyst and proton-conducting polymer (ionomer) over the electrode regions next to the membrane. Because of the low coating level (for example about 0.1 mg $Pt/cm^2$), the pores between the catalyst particles may in this case be fully or partly filled with ionomer.

A further catalyst layer is arranged on the proton-conducting membrane. This layer may likewise be deposited directly on the membrane by plasma-chemical means, but may also be applied using other techniques. After this, the second collector is arranged on this catalyst layer, this collector generally consisting of the same material as the first collector, and the entire arrangement is then compressed.

As an alternative, a complete planar arrangement, consisting of catalyst material and collector, may be pressed onto the membrane in order to produce the fuel cell. Here again, a prerequisite is sufficient planarity for obtaining a good contact, which is achieved by a layer of carbon aerogel. A further production possibility consists in likewise depositing a membrane on the second electrode, and then forming the thin-layer fuel cell from the two identically constructed components using a joining process, for example by pressing. This greatly reduces the risk of pin-holes.

A joining layout in which the two collectors are of different size is advantageous for the construction of the fuel cell according to the invention. Indeed, this allows a gas-tight electrically insulating connection between the anode and cathode spaces. Sealing of this type is possible both with a conventional cell design, as disclosed, for example, by DE-A 33 21 984, and with an innovative approach, which constitutes the subject-matter of DE-C 44 42 285.

Figure 1:
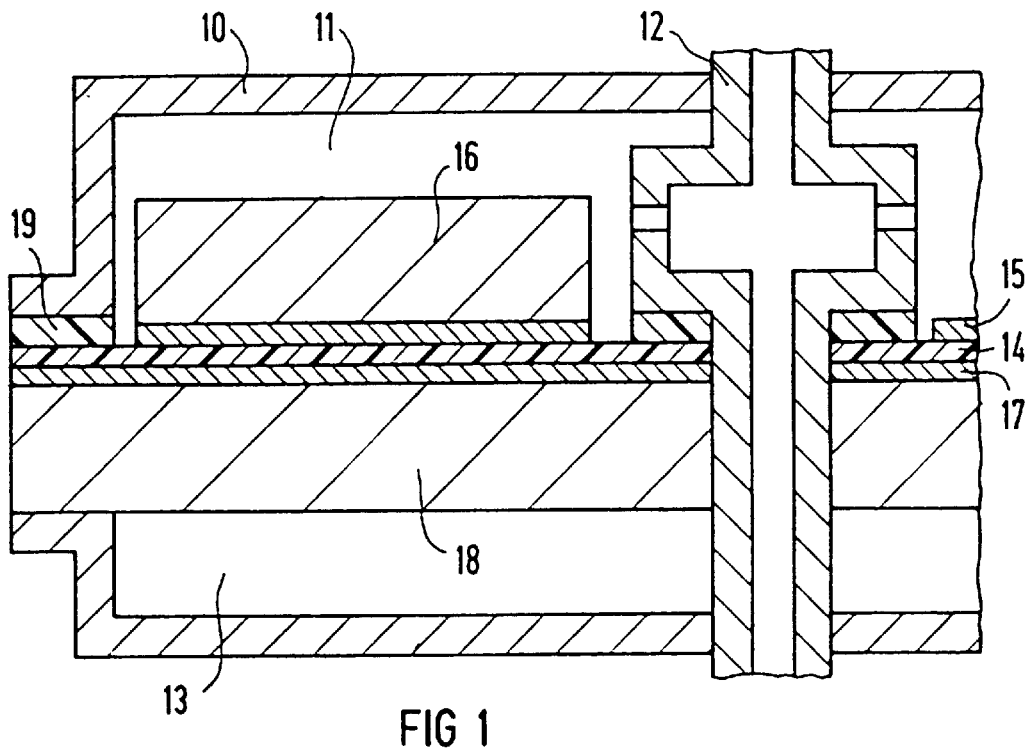
FIG. 1 represents the joining method for the membrane/electrode unit of a known fuel cell with air operation. In this case, an additional sealant is used, which need not consist of the membrane material and, for example, may also enclose the entire periphery of the membrane/electrode unit.
Figure 2:
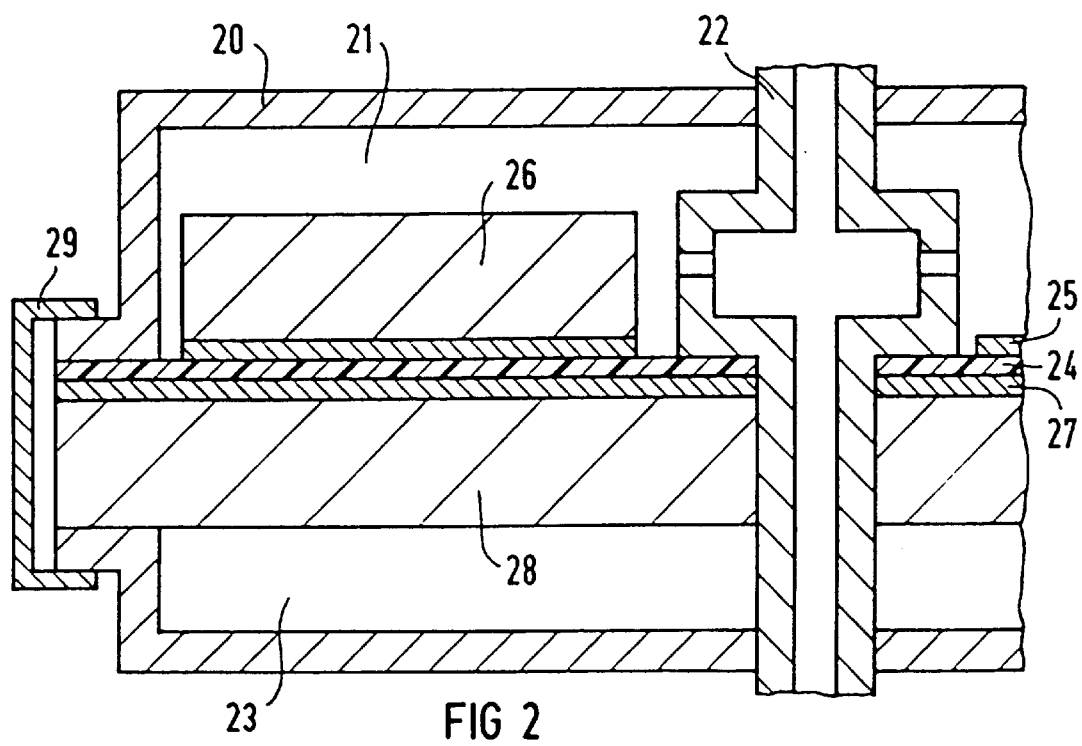
FIG. 2 shows the joining method for the cell design of the above-mentioned innovative fuel cell.

In FIGS. 1 and 2, the indicated reference numbers have the following meaning:

10, 20: cell housing
11, 21: hydrogen gas space
12, 22: gas tube
13, 23: air/gas space
14, 24: membrane
15, 25: anode
16, 26: collector
17, 27; cathode
18, 28 collector
19: seal
29: clamp The structure of the fuel cell according to the invention solves as follows the problems which arise with conventional fuel cells:

the small layer thickness results in a small layer resistance and a higher reverse diffusion of water, that is to say the membrane does not dry out;

because of the smooth carbon aerogel layer, intimate contact between the electrode/membrane unit and the collector is possible;

the low level of catalyst coating results in a more economical production process;

the production method is environmentally friendly since vacuum processes are employed.

What is claimed is:

1. A fuel cell comprising:

a proton-conducting membrane (14) having a layer thickness of 3 to 50 μm, a collector arranged on each side of the membrane (14), the collectors being provided with an electrically conductive gas-permeable carbon aerogel with a surface roughness of <2 μm on their side facing the membrane (14), a catalyst layer (15, 17) of platinum or a platinum alloy applied onto the carbon aerogel by material bonding, wherein the membrane (14) is located between the catalyst layers (15, 17) and is deposited by plasma-chemical means.

2. The fuel cell as claimed in claim 1, wherein the carbon aerogel has an electrical conductivity of between $10^{-2}$ and $10^3$ $\Omega^{-1} \cdot cm^{-1}$ and a density of between 0.06 and 0.7 g/cm$^3$.

3. The fuel cell as claimed in claim 2, wherein the carbon aerogel has a layer thickness of $\geq 100$ μm.

4. The fuel cell as claimed in claim 2, wherein the collectors (16, 18) consist of graphite paper or carbon fabric.

5. The fuel cell as claimed in claim 2, wherein the membrane (14) has an electrical resistivity of <10 Ω·cm in the wet state.

6. The fuel cell as claimed in claim 1, wherein the carbon aerogel has a layer thickness of $\geq 100$ μm.

7. The fuel cell as claimed in claim 6, wherein the collectors (16, 18) consist of graphite paper or carbon fabric.

8. The fuel cell as claimed in claim 6, wherein the membrane (14) has an electrical resistivity of <10 Ω·cm in the wet state.

9. The fuel cell as claimed in claim 1, wherein the collectors (16, 18) consist of graphite paper or carbon fabric.

10. The fuel cell as claimed in claim 1, wherein the membrane (14) has a layer thickness of 5 to 20 μm.

11. The fuel cell as claimed in claim 1, wherein the membrane (14) has an electrical resistivity of <10 Ω·cm in the wet state.

12. The fuel cell as claimed in claim 1, wherein the membrane is produced from gaseous monomers in a low-pressure plasma, between $10^{-4}$ and 10 mbar, excited by radio-frequency, microwaves or an electron cyclotron resonance transmitter.

13. The fuel cell as claimed in claim 1, wherein the platinum catalyst is produced from gaseous platinum compounds in a low-pressure plasma, between $10^{-4}$ and 10 mbar, excited by radio-frequency, microwaves or an electron cyclotron resonance transmitter, and has an electrical resistivity of <1 mΩ·cm.

14. The fuel cell as claimed in claim 1, wherein the collectors (16, 18) are of different size.

* * * * *